United States Patent [19]

Kunkel

[11] Patent Number: 5,000,857

[45] Date of Patent: Mar. 19, 1991

[54] WATER-OIL SEPARATION METHOD

[76] Inventor: Ferney R. Kunkel, P.O. Box 901, Albany, Tex. 76430

[21] Appl. No.: 396,297

[22] Filed: Aug. 21, 1989

[51] Int. Cl.$^5$ ................................................ C02F 1/54
[52] U.S. Cl. ..................................... 210/708; 210/725; 210/730; 210/728; 210/728; 252/331; 252/358; 536/3
[58] Field of Search ............... 210/708, 725, 730, 737, 210/738, 766, 800, 728; 536/3; 252/358, 328, 331

[56] References Cited

U.S. PATENT DOCUMENTS

| | | | |
|---|---|---|---|
| 2,117,378 | 5/1938 | Tiffany | 210/730 |
| 2,126,368 | 8/1938 | Colbeth | 210/708 |
| 2,318,714 | 5/1943 | Robertson et al. | 210/708 |
| 2,778,797 | 1/1957 | Dickenson | 210/2 |
| 2,845,363 | 7/1958 | Gutzeit | 106/205 |
| 3,227,616 | 1/1966 | Van Wessem et al. | 167/91 |
| 3,756,959 | 9/1973 | Vitalis et al. | 210/708 |
| 4,272,571 | 6/1981 | Romero-Sierra et al. | 252/403 |

Primary Examiner—Peter Hruskoci
Assistant Examiner—Krisanne Shideler
Attorney, Agent, or Firm—Charles D. Gunter, Jr.

[57] ABSTRACT

A method is shown for separating water from an oil-water system. A separator composition is blended from cactus extract, and activator and a carrier liquid. The separator composition causes separation of the oil and water into distinct layers which allows the water to be drawn off.

1 Claim, No Drawings

WATER-OIL SEPARATION METHOD

BACKGROUND OF THE INVENTION

1. Field of the Invention

The present invention relates to a method for separating oil from fresh and brine water.

2. Description of the Prior Art

There are many instances in which it is desirable to separate crude oil and refined oil products from water, either saline or fresh. A particular application is the separation of water from sludge oils of the type which collect in oil storage tanks associated with producing wells.

In the past, sludge oils were collected from remote locations in the field and hauled to a treatment plant in order to break-out the water component of the sludge oil. In order to be commercially valuable, the sludge oils must possess a high paraffin content and zero water content. Elaborate refining and purifying processes have been utilized in the past which added greatly to the cost of the recovered product. Additionally, certain of these prior art processes employed chemical additives which were harmful if leaked to the surrounding soil or water table.

A need exists for a water oil separation method which is simple in operation and economical to practice.

A need also exists for a water oil separation technique which can be employed in the field at a storage tank location to drop the water component from sludge oils contained in an oil storage tank.

A need also exists for such a water oil separation method which utilizes a natural organic additive for separating the oil and water into distinct layers which can be easily separated.

SUMMARY OF THE INVENTION

In the method for separating water from oil in an oil-water system of the invention, a separator composition is first blended which comprises cactus extract, an activator for the cactus extract and a carrier liquid. The separator composition is then added to the water-oil system in an amount which is effective to form an oil layer and a separate water layer in the system. The water layer can then be separated from the oil layer.

Preferably, the cactus extract is made from the leaves and stems of the prickly pear or Opuntia family of cactus. The leaves and stems are crushed to form a pulp in water and the fibrous solids are separated from the aqueous extract. The resulting cactus extract is most effective as a water-oil separator if a accompanied by a detergent activator. The separator composition is used in the range from about 0.18 to 0.25 gallons per 42 gallon barrel of the oil-water system being treated.

Additional object, features and advantages will be apparent in the written description which follows.

DETAILED DESCRIPTION OF THE INVENTION

In the first step of the method of the invention, a separator composition is blended which comprises cactus extract, an activator for the cactus extract, and a carrier liquid. The cactus extract is preferably prepared by producing a pulp of the leaves and stem from a cactus such as the prickly pear or Opuntia cactus. The leaves and stems of the cactus are boiled at a rolling boil in water at the ratio of about 1 pound of prickly pear cactus parts to 1 3/4 gallons of water. The cactus parts are boiled at approximately 212° F. at sea level, or at the boiling point of the carrier liquid, until there is a definite color change in the solid material of the prickly pear. The fibrous solids are then separated from the extract by screening, filtering, centrifuging, pressing, or other suitable techniques. The resulting liquid extract which has been separated from the fibrous solids is then preferably treated with citric acid to inhibit fermentation. Preferably, the citric acid is added to the liquid extract in an amount in the range from about 0.1 to 3.0% by volume of the liquid extract.

The activator which is used with the cactus extract in the preferred method is a detergent activator. By "detergent activator" is meant a washing or cleansing type product which contains an organic surface active compound, and which may also contain a detergent builder.

A surfactant is an organic compound consisting of two parts: (1) a hydrophobic portion, usually including a long hydrocarbon chain; and (2) a hydrophilic portion which renders the compound sufficiently soluble or dispersible in water or another polar solvent. The combined hydrophobic and hydrophilic moieties render the compound surface active and thus able to concentrate at the interface between a surfactant solution and another phase.

Preferably the surfactant present is an anionic surfactant in which the hydrophilic portion of the molecule carries a negative charge. Preferred anionic surfactants include linear sodium alkyl benzene sulfonates, linear alkyl sulfates and linear alkyl ethoxy sulfates. Particularly preferred is sodium lauryl ether sulfate. The surfactant composition can also include a nonionic material selected from the group consisting of alkyl ethoxyolates, the ethoxyolated alkyl phenols the fatty acid ethanol amides, and complex polymers of ethylene oxide, propylene oxide, and alcohols. Particularly preferred is the fatty acid diethanol amide.

The activator can also include various detergent builders, that is, an ingredient which will chelate or precipitate polyvalent metal ions. The preferred builder materials are condensed polyphosphates, including pentasodium tripolyphosphate, tetrasodium pyrophosphate, with the most preferred material being tetrapotassium pyrophosphate.

The preferred activator contains about 60-80% water, 0.5-5.0% tetrapotassium pyrophosphate, 5-10% sodium lauryl ether sulfate 10-20% mixed fatty acid diethanolamide, 0.1-2.0% ethylene glycol monostearate and 0.5-5.0% sodium sulfate, all percentages being by volume, based on the total volume of activator. The most preferred activator is a mixture of approximately 72.70% water, 2.21% tetrapotassium pyrophosphate, 7.12% sodium lauryl ether sulfate, 14.45% mixed fatty acid diethanolamide, 0.91% ethylene glycol monostearate and 2.61% sodium sulfate.

The separator composition is preferably blended by mixing together approximately 75% by volume water, 20% by volume cactus extract and 5% by volume detergent activator. The separator composition can be used to separate oil from water in either hot or cold operations. In the cold operation, the amount of water present in the oil-water system is first estimated. An appropriate amount of the separator composition is then added to the oil-water system, keeping the pH of the system in the range from about 5.5 to 6.0. Typically, the separator composition is added in the range from about 0.18 to 0.25 gallons per 42 gallon barrel of the oil-water system being treated. The oil-water system containing the separator composition is then agitated for approximately 2 to 4 hours, as by using a screw agitator, to obtain a complete dispersion of the cactus extract within the system. After allowing suitable time for the oil and water layers to separate, the water layer can then be drawn off, as by draining from the tank containing the oil-water system. The period of time varies with the make-up and volume of the oil-water system but is typically about 2-10 hours.

In the hot application method, the oil-water system is first heated to a rolling boil. Separator composition is then added to the oil-water system and the application of heat is discontinued after a period of less than 1 hour, typically 10 to 15 minutes. After the system has cooled, and the water and oil layers have been allowed to separate, the water can be drained from the bottom of the tank. Again, the time period for separation varies but is typically on the order of 2-10 hours.

In an actual field trial, 50 gallons of the separator composition of the invention were used to treat 1,700 barrels of sludge oil in an oil storage tank with the water content of the sludge being dropped out in approximately 2 hours time.

An invention has been provided with several advantages. The separation method of the invention is simple to practice and economical in operation. The separation method is as effective, and in some cases more effective, than prior art techniques which utilized exotic and potentially harmful chemicals. The principal ingredient of the separator composition of the invention is made from the extract of a plentiful organic material, the prickly pear cactus.

I claim:

1. A method for separating water from sludge in an oil storage tank, the method, comprising the steps of:

blending a separator composition comprising approximately 20% by volume cactus extract, 5% by volume detergent activator for the cactus extract, and 75% by volume water as a carrier liquid;

adding to the sludge in the oil storage tank about 0.18 to 0.25 gallons of separator composition per 42 gallon barrel of sludge to be treated, the amount of separator composition being effective to maintain the pH of the sludge in the range from about 5.5 to 6.0;

agitating the sludge to evenly disperse the separator composition therein, to thereby form an oil layer and a separate water layer in the tank; and draining off the water layer from the tank, leaving the remaining oil layer in the storage tank.

* * * * *